United States Patent [19]

Pliml

[11] Patent Number: 4,636,603
[45] Date of Patent: Jan. 13, 1987

[54] TWO-POSITION ELECTRICAL SWITCH ASSEMBLY

[75] Inventor: Frank V. Pliml, Arlington Heights, Ill.

[73] Assignee: Illinois Tool Works Inc., Chicago, Ill.

[21] Appl. No.: 835,624

[22] Filed: Mar. 3, 1986

Related U.S. Application Data

[63] Continuation-in-part of Ser. No. 677,444, Dec. 3, 1984, abandoned.

[51] Int. Cl.[4] ............................................. H01H 27/04
[52] U.S. Cl. ................................. 200/296; 200/43.07; 200/61.19; 200/153 M; 200/284
[58] Field of Search ................... 200/153 M, 284, 296, 200/43.04, 43.05, 43.07, 61.19

[56] References Cited

U.S. PATENT DOCUMENTS

| | | | |
|---|---|---|---|
| 690,364 | 12/1901 | Gaffney | 200/153 M |
| 2,239,426 | 4/1941 | Kimball | 200/153 M |
| 2,438,094 | 3/1948 | Petrullo | 200/43.05 |
| 2,742,627 | 4/1956 | Lazzery et al. | 339/128 |
| 3,045,079 | 7/1962 | Frantz et al. | 200/296 |
| 3,476,900 | 11/1969 | Sharples | 200/296 |
| 3,486,157 | 12/1969 | Campbell | 200/296 |
| 4,080,522 | 3/1978 | Schimmels | 200/296 |

FOREIGN PATENT DOCUMENTS 179289  5/1922  United Kingdom ............. 200/61.19

Primary Examiner—Stephen Marcus
Assistant Examiner—Renee S. Luebke
Attorney, Agent, or Firm—J. P. O'Brien; T. W. Buckman

[57] ABSTRACT

A two-position electrical switch assembly is disclosed for mounting in an aperture of a metal panel. The housing for the switch assembly is constructed of an electrically non-conducting body having a head portion and a shank portion. The head portion is integrally formed with the shank portion such that the shank portion extends transversely away from a panel contacting surface of the head portion. A central opening is formed through the head portion and extends coaxially with an axial opening formed longitudinally through the shank portion. The shank portion includes means for resiliently mounting the switch assembly housing in the apertured middle panel where the resilient mounting means includes a first electrical conducting member, a pair of spring-biased electrical conducting fingers, and a second electrical conducting member. The pair of spring-biased electrical conducting fingers are disposed longitudinally in the axial bore with their free ends normally biased together. One of the pair of conducting fingers is connected to the first electrical conducting member and the other pair of conducting fingers is connected to a second electrical conducting member which has an electrical terminal portion extending outwardly of the body portion. A plunger element of an electrically non-conducting material is inserted through the central opening to cause the pair of spring-biased fingers to separate and thereby open the electrical conducting path between the first and second conducting members.

5 Claims, 9 Drawing Figures

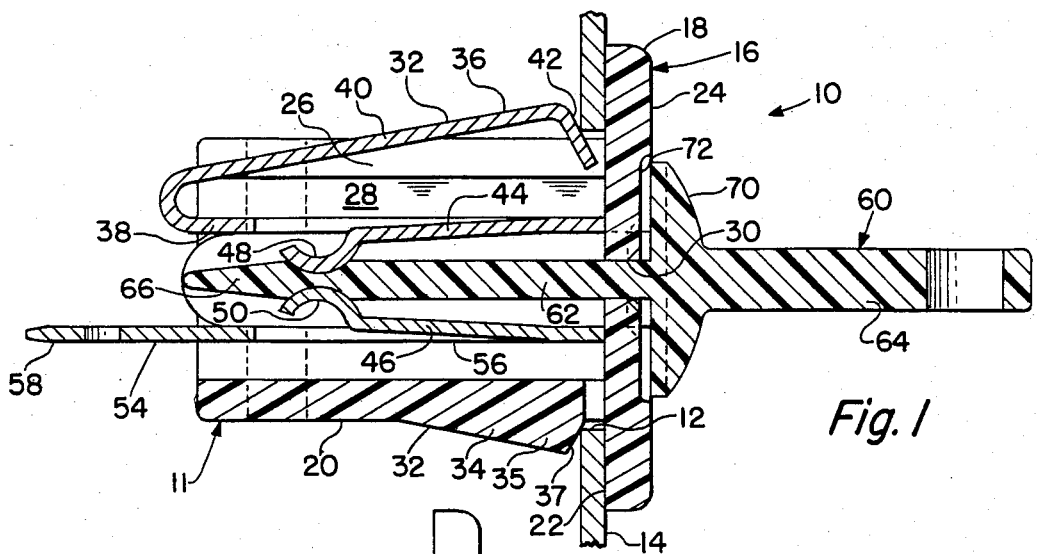

TWO-POSITION ELECTRICAL SWITCH ASSEMBLY

This is a continuation-in-part application of U.S. patent Ser. No. 677,444, which was filed on Dec. 3, 1984, now abandoned.

BACKGROUND OF THE INVENTION

This invention relates to a two-position switch assembly and in particular to a two-position switch assembly which can be readily mounted in an apertured panel.

This invention is designed to provide a two-position switch assembly which is inexpensive to manufacture and can be quickly assembled.

Another object of this invention is to provide a two-positiuon switch assembly which is highly reliable and easy to operate.

SUMMARY OF THE INVENTION

A two-position switch assembly is designed for mounting in an aperture of a metal panel in order to form an on-off switch relationship between the metal panel and an electrical conductor extending from the housing of the switch assembly. The switch assembly is constructed as an electrically non-conducting body having a head portion and a shank portion. The shank portion includes a pair of resilient mounting means for securing the switch assembly in the apertured panel. One of the pair of mounting means is constructed of electrical conducting material. A pair of spring-biased electrical conducting fingers is disposed axially of a longitudinal bore formed through the center of the body portion with the conducting fingers having their free ends normally biased together. The electrically conducting resilient mounting means is connected to one of the pair of conducting fingers. The other conducting finger is connected to a terminal member which extends outwardly of the switch assembly body. A plunger element of electrically non-conducting material cooperates to separate the electrical conducting fingers and thereby open the electrical conducting path between the electrically conducting resilient mounting means and the externally extending terminal.

DESCRIPTION OF DRAWING

For a better understanding of this invention, reference should be made to the accompanying drawing, in which:

FIG. 1 is a cross sectional view of the preferred embodiment of this invention depicting the switch actuating member inserted into the switch assembly housing to provide an electrical non-conducting condition;

FIG. 2 is a top plan view of the switch assembly housing of FIG. 1;

FIG. 3 is a front plan view taken from the left side of FIG. 2 of the switch assembly housing of FIG. 1 and further illustrating the internal electrical connections of the switch assembly shown in dotted lines;

FIG. 4 is a right side plan view of FIG. 3;

FIG. 5 is a partial drawing of the switch actuating member which is depicted in FIG. 1;

DESCRIPTION OF PREFERRED EMBODIMENT

Figure 6:
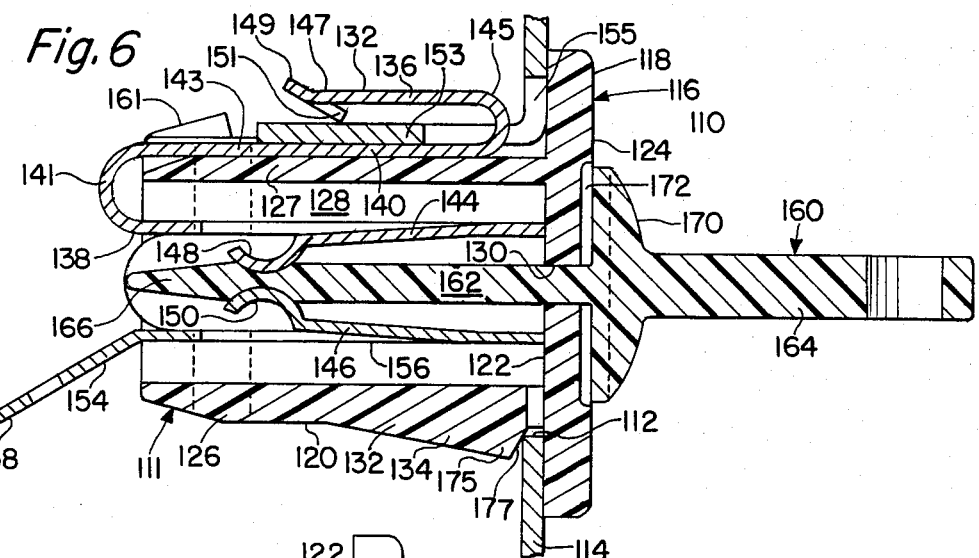
FIG. 6 is across sectional view of the second embodiment of this invention depicting the switch actuating member inserted into the switch assembly housing to provide an electrical non-conducting condition.

Referring now to FIG. 1, there is illustrated a two-position switch assembly generally designated by the reference numeral 10. The switch assembly 10 is depicted as mounted in an aperture 12 formed through a metal panel 14.

The switch assembly 10 has a housing member 11 molded as an electrically non-conducting body 16. Body 16 is constructed with a head portion 18 and a shank portion 20.

The head portion 18 is shaped with a circular disc configuration having a metal panel engaging surface 22 and a generally parallel outer exposed surface 24.

Integrally formed with the head 18 is shank portion 20, which has a generally rectangular configuration that extends in a normal relation to the panel engaging surface 22 of head portion 18. The rectangular base 26 of shank portion 20 has a rectangular-shaped bore 28 which is formed longitudinally of the rectangular base 26. The center axis of the bore 28 serves also as the axis for a central opening 30 through the center of head portion 18.

The body member 16 is mounted through the aperture 12 in metal panel 14 with a snap fitting engagement by virtue of a pair of resilient arm means 32. One of the resilient means 32 is an integrally formed latching arm 34 which is normally biased at its free end 35 to extend outwardly of base 26. a diverging shoulder 37 engages the edge of opening 12 in the metal panel 14 as illustrated in FIG. 1.

The other resilient latching means 32 is constructed of an electrically conducting strip 36 which forms a means of connecting the switch 10 to the metal panel 14. The electrical conducting strip 36 has a base portion 38 and a spring arm portion 40. Spring arm portion 40 is normally spring biased away from the base 38 and has a shoulder engaging surface 42.

Mounted centrally of the cylindrical bore 28 is a pair of spring-biased electrical conducting fingers 44 and 46. The pair of conducting fingers 44 and 46 extend from the head portion 18 and converge together at their free ends 48 and 50, respectively, to establish normally closed contact relationship.

An external electrical terminal for switch assembly 10 is provided by electrical conducting member 54 having one end integral with spring-biased electrical conducting finger 46 and the other end 58 extending outwardly of the cylindrical bore 28.

It will be appreciated from the foregoing description of the electrical conducting memebers that an electrical conducting path is formed from the metal panel 14, through the spring-biased electrical contact 36, through the normally closed spring-biased pair of electrical conducting finger 44, 46 and to the external terminal blade 58 of electrical conducting member 54. This normally closed switch assembly 10 is adapted to be placed in the open condition by the insertion of a swtich actuating member 60 through the central opening 30. The non-electrical conducting rod portion 62 of switch actuating member 60 separates the free ends 48 and 50 of spring-biased fingers 44 and 46, respectively, to break open the electrical circuit path.

The actuating member 60 is manipulated by a handle portion 64. For economy purposes, it is preferable that the switch actuating member be molded of a polymeric resinous material.

For ease in separating the pair of electrical conducting finger 44 and 46, the blade portion 62 has a pointed end 66.

A conical shaped disc 70 forms a stop means at the juncture of the blade portion 62 and handle portion 64. As illustrated in FIG. 1, the surface 24 has a circular recess 72 formed about central opening 30, which forms a seat for the disc 70.

From the foregoing description, it will be appreciated that the switch assembly 10 is relatively easy to manufacture and assemble. The resulting structure is readily installed in the aperture of a metal plate without the need for any tools. The snap fitting engagement of the resilient leg means securely holds the switch assembly into the mounted aperture. Once the switch assembly is installed in the metal panel 14, the switch assembly can be connected to an external device by electrical conducting terminal blade 58 and through the grounding circuit provided by metal panel 14.

The insertion of the switch actuating member 60 into the switch housing is a visual indicator to the user that the switch is in the open-circuit condition.

It will be appreciated that the switch assembly 10 could be used for a wide variety of applications where one of the terminal connections is through a grounding plate such as metal plate 14 illustrated in FIG. 1.

DESCRIPTION OF SECOND EMBODIMENT

Referring now to FIG. 6, there is illustrated a two-position switch assembly generally designated by the reference numeral 110. The switch assembly 110 is depicted as mounted in an aperture 112 formed through a metal panel 114.

The switch assembly 110 has a housing member 111 employing an electrically non-conducting body 116. Body 116 is constructed with a head portion 118 and a shank portion 120.

The head portion 118 is shaped with a circular disc configuration having a metal panel engaging surface 122 and a generally parallel outer exposed surface 124.

Integrally formed with the head 118 is shank portion 120, which has a generally rectangular configuration that extends in a normal relation to the panel engaging surface 122 of head portion 118. The generally rectangular-shaped base 126 shank of portion 120 has a rectangular-shaped bore 128 which is formed longitudinally of the rectangular base 126. The center axis of the bore 128 serves also as the axis for a central opening 130 through the center of head portion 118.

The body member 116 is mounted through the aperture 112 in metal panel 114 with a snap fitting engagement by virtue of a pair of resilient arm means 132. One of the resilient means 132 is an integrally formed latching arm 134 which is normally biased at its free end 175 to extend outwardly of base 126. A diverging shoulder 177 engaged the edge of opening 112 in the metal panel 114 as illustrated in FIG. 6.

The other resilient latching means 132 is constructed of an electrically conducting strip 136 which forms a means of connecting the switch assembly 110 to the metal panel 114. The electrical conducting strip 136 has a base portion 138 and a spring arm portion 140. Spring arm portion 140 is interconnected to base 138 by U-shaped portion 141. Spring arm portion 140 has a U-shaped configuration formed by stem 143 and hook 145. The free end 147 of hook 145 has an out-turned flange 149 with a pair of inner directed spurs 151.

Figure 9:
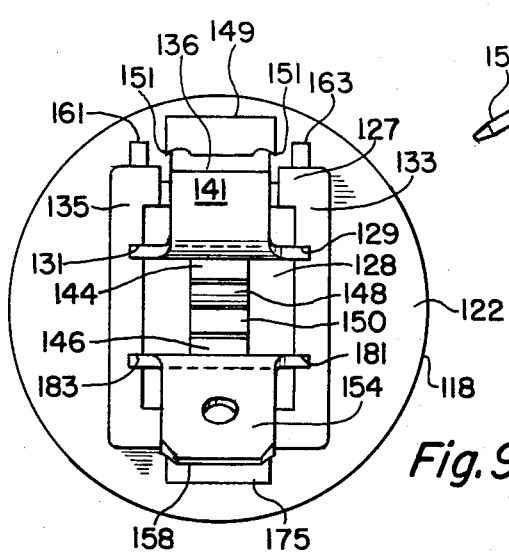
FIG. 9 is a right side plan view of FIG. 8.

Electrical conducting strip 136 is mounted on rectangular base 126 of shank 120 by installing its base portion 138 and spring arm portion 140 on opposite surfaces of sidewall 127 of rectangular base 126 so that U-shaped portion 140 curves around the bottom edge of sidewall 127. Base portion 138 has its lateral edges slidably inserted into a pair of straight channels 129 and 131 (FIG. 9) which are formed in sidewalls 133 and 135 in a parallel relationship to sidewall 127.

Figure 7:
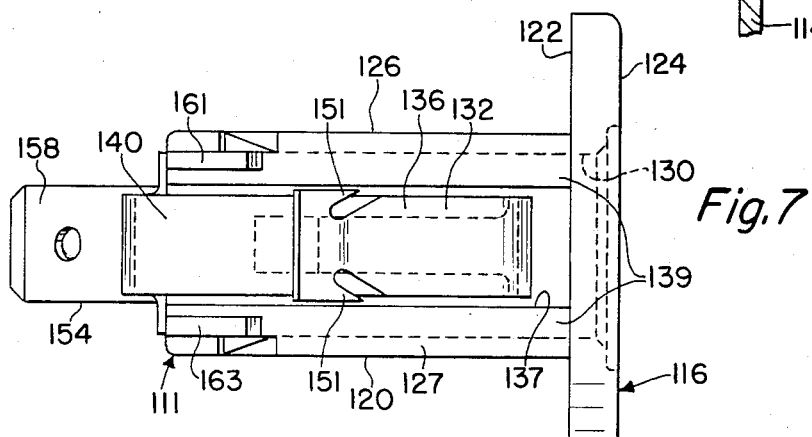
FIG. 7 is a top plan view of the switch assembly housing depicted in FIG. 6.
Figure 8:
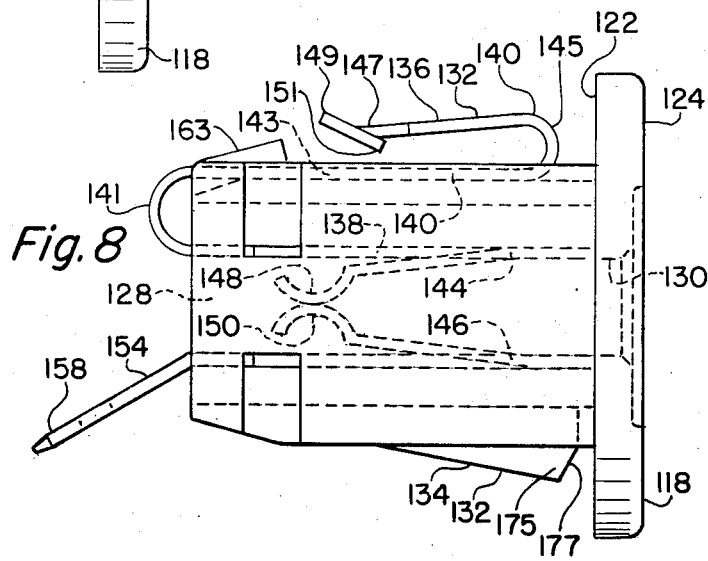
FIG. 8 is a front plan view taken from the left side of FIG. 7 of the switch assembly housing of FIG. 1 and further illustrating the internal electrical connections of the switch assembly shown in dotted lines.

Spring arm portion 140 of electrical conducting strip 136 is slidably received in longitudinally extending channel 137 (FIG. 7) formed along the center portion of outside surface 139 of sidewall 127.

To ensure good electrical connection between metal panel 114 and electrical conducting strip 136, a right-angled plate member 153 (FIG. 6) extends outwardly of panel aperture 112. Plate member 153 has a central L-shaped opening 155 formed in its center portion and the adjacent portion of aperture 112.

When the switch assembly 110 is inserted through aperture 112 of metal panel 114, hook 145 of spring arm portion 140 fits through opening 155 and snaps over the plate member 153. The pair of spaced spurs 51 press against plate member 153 to provide a reliable electrical connection.

Mounted centrally of the cylindrical bore 128 is a pair of spring-biased electrical conducting finger 144 and 146. The pair of conducting fingers 144 and 146 extend from the head portion 118 and converge together at their free ends 148 and 150, respectively, to establish a normally closed contact relationship.

Electrical conducting finger 144 is integrally formed with base portion 138 of electrical conducting strip 136.

An external electrical terminal 158 for switch assembly 110 is provided by electrical conducting member 154 having one end formed integral spring-biased electrical conducting finger 146 and the other end extending outwardly of cylindrical bore 128 to define external terminal blade 158.

Electrical conducting member 154 is slidingly received in parallel channels 181 and 183 (FIG. 9) formed on the inside surfaces of sidewalls 133 and 135, respectively.

It will be appreciated from the foregoing description of the electrical conducting members that an electrical conducting path is formed from the metal panel 114, through the spring-biased electrical contact 136, through the normally closed spring-biased pair of electrical conducting fingers 144, 146 and to the external terminal blade 158 of electrical conducting member 154.

The normally closed switch assembly 110 is adapted to be placed in the open condition by the insertion of a switch actuating member 160 through the central opening 130. The non-electrical conducting rod portion 162 of switch actuating member 160 separates the free ends 148 and 150 of spring-biased fingers 144 and 146, respectively, to break open the electrical circuit path.

The actuating member 160 is manipulated by a handle portion 164. For economy purposes, it is preferable that the switch actuating member be molded of a polymeric resinous material.

For ease in separating the pair of electrical conducting finger 144 and 146, the blade portion 162 has a pointed end 166.

A conical shaped disc 170 forms a stop means at the juncture of the blade portion 162 and handle portion 164. As illustrated in FIG. 6, surface 124 has a circular recess 172 formed about central opening 130, which forms a seat for disc 170.

From the foregoing description, it will be appreciated that the switch assembly 110 is relatively easy to manufacture and assemble. The resuling structure is readily installed in the aperture of a metal plate without the need for any tool. The snap fitting engagement of the resilient leg means securely holds the switch assembly into the mounted aperture. Once the switch assembly is installed in the metal panel 114, the switch assembly can be connected to an external device by electrical conducting terminal blade 158 and through the grounding circuit provided by metal panel 114.

The insertion of the switch atuating member 160 into the switch housing is a visual indicator to the user that the switch is in the open-circuit condition.

To ensure that the switch assembly 110 is securely retained within aperture 112 of metal panel 114 as switch actuating member 160 is repeatedly withdrawn from switch assembly 110, housing member 111 has a pair of integrally-formed ramps 161 and 163 on outside surface 139 at the bottom of sidewall 127. The pair of ramps 161, 163 straddle spring arm portion 140 of electrical conducting strip 136. Any outward pull on switch assembly housing 111 will cause the pair of ramps 161, 163 to abut against the lower edge of plate member 153. Simultaneously shoulder 177 of latching arm 134 engages the metal panel 114 to prevent the housing member from being accidentally removed therefrom.

I claim:

1. A two position four piece switch assembly for mounting in an aperture of a metal panel, comprising an electrically non-conducting body having a head portion and a shank portion, said head portion having a panel contacting surface and an outer exposed surface with a central opening formed through said head portion between the two surfaces, said shank portion integrally formed with said head portion and extending transversely away from said panel contacting surface, a longitudinal bore formed through said shank portion along the axis of said central opening of said head portion, said shank having an opening along its length extending through to said bore whose inner side walls adjacent said opening have a first and second channel formed therein parallel to said opening for snap engagement with a first and second electrical conducting member respectively, said first electrical conducting member having a base and an integrally formed outwardly projecting electrical conducting spring biased finger on one side thereof with an integrally formed spring arm member on its other side which when affixed to said first channel normally protrudes through said shank opening with its free end disposed adjacent said head portion to maintain electrical contact with said panel as well as providing a means for resiliently mounting said switch assembly, said second electrical conducting member having a base and an integrally formed outwardly projecting electrical conducting spring biased finger on one side thereof and an integrally formed terminal portion extending outwardly from said base in a direction perpendicular to said finger which when affixed to said second channel normally protrudes out of said bore of said shank away from said head portion, said fingers being disposed within said longitudinal bore with their free ends normally biased together along said bore axis, and a removable switch actuating means for separating said pair of spring-biased fingers comprising an electrically non-conducting rod portion of a cross-section smaller than said central opening and a handle portion, whereby the insertion of said rod portion through said central opening causes the separation of said spring-biased fingers to open the electrical conducting path between said first and second electrical conducting members.

2. A two-position switch assembly as defined in claim 1 wherein said switch further comprises a resilient mounting means having an integrally formed resilient arm extending outwardly of said body portion with a free end outwardly of said body portion and adjacent said head portion for affixing said switch to said panel.

3. A two position four piece switch assembly for mounting in an aperture of a metal panel, comprising an electrically non-conducting body having a head portion and a shank portion, said head portion having a panel contacting surface and an outer exposed surface with a central opening formed through said head portion between the two surfaces, said shank portion having as rectangular shaped base member integrally formed with said head portion and extending transversely away from said panel contacting surface, a longitudinal bore formed through said base member along the axis of said central opening of said head portion, said base member having a first and second channel formed into the inner sidewall of two opposing walls of said base member extending parallel to said bore axis for snap engagement with first and second electrical conducting members respectively, said first electrical conducting member having a base portion and an integrally formed outwardly projecting electrical conducting spring biased finger on one side thereof with an integrally formed spring arm member on its other side, said base portion disposed within said first channel and said spring arm member protruding outwardly of said base member with its free end shaped to maintain electrical contact with said panel as well as providing a means for resiliently mounting said switch assembly, said second electrical conducting member having a base and an integrally formed outwardly projecting electrical conducting spring biased finger on one side thereof and an integrally formed terminal portion extending outwardly from said base in a direction perpendicular to said finger which when disposed within said second channel normally protrudes out of said bore of said shank away from said head portion, said fingers being disposed within said longitudinal bore with their free ends normally biased together along said bore axis, and a removable switch atuating means for separating said pair of spring-biased fingers comprising an electrically non-conducting rod portion of a cross-section smaller than said central opening and a handle portion, whereby the insertion of said rod portion through said central opening causes the separation of said spring-biased fingers to open the electrical conducting path between said first and second electrical conducting members.

4. A two-position switch assembly as defined in claim 3 wherein said switch further comprises a resilient mounting means having an integrally formed resilient arm extending outwardly of said body portion with a free end outwardly of said body portion and adjacent said head portion for affixing said switch to said panel.

5. A two-position switch assembly as defined in claim 3, wherein said spring arm member of said first electrical conducting member comprises a U-shaped portion extending beyond the end of said base member, a stem portion interconnected to said base portion and said free end by said U-shaped portion, and said free end comprises a resilient hook interconnecting said stem portion and an end flange.

* * * * *